United States Patent Office 2,846,411
Patented Aug. 5, 1958

2,846,411

STABILIZED UNSATURATED POLYESTER COMPOSITION CONTAINING AN AMIDINE SALT AND PROCESS OF MAKING SAME

Edwin W. Meyer, Chicago, and Jerome G. Klein, Morton Grove, Ill., assignors to The Glidden Company, Cleveland, Ohio, a corporation of Ohio No Drawing. Application March 19, 1956
Serial No. 572,192

15 Claims. (Cl. 260—45.4)

This invention relates to novel compositions of matter. More particularly, it relates to polymerizable compositions comprising polyesters derived from a polyhydric alcohol, an ethylenically unsaturated polycarboxylic acid and a material capable of preventing premature gelation of the polymerizable composition. Especially, our invention relates to such compositions in which an amidine salt is present as the stabilizing agent and to processes of preparing such novel stabilized polymerizable compositions.

It has long been known that polymerizable alkyd resin compositions and especially those derived from mixtures of esters of polyhydric alcohols and ethylenically unsaturated polycarboxylic acids readily react between the ethylenic groups of the polyesters to form useful polymeric products.

It is well known, also, to admix such reactive compositions with ethylenically unsaturated compounds and by various means, e. g., heating in the presence of catalysts, to effect a copolymerization of the mixture. This copolymerization can occur even at room temperature in instances of highly reactive components, often with the evolution of heat, which serves to accelerate the reaction. A mixture of a polyester of maleic or fumaric acid with diethylene glycol, together with an ethylenically unsaturated compound, such as styrene, is an example of such a highly-reactive mixture. Such a mixture will commence to gel (i. e., to copolymerize) almost at once, even at room temperature.

This undesirable inherent characteristic of copolymerizable mixtures to react prematurely was recognized by Ellis, who in U. S. Patent No. 2,255,313, proposed to inhibit or otherwise control such premature reaction by the addition of an α-cellulose to the composition.

Ellis' discovery, while not entirely satisfactory, proved that premature gelation could be inhibited. Subsequently, with the growth of the field of application of copolymerizable resinous compositions in the plastics art, an intensive search was begun for improved means for controlling and/or reducing this tendency of polymerizable compositions to undergo premature reaction. This search centered on providing polymerizable compositions comprising an ester of a polyhydric alcohol and an ethylenically unsaturated polycarboxylic acid and mixtures of such esters with copolymerizable ethylenically unsaturated compound, which compositions possessed some, and desirably all of the following characteristics:

(1) Prior to incorporation of the polymerization catalyst, the mixture will have an acceptable shelf life, i. e., the polymerizable composition will not undergo premature gelation.

(2) After the addition of the polymerization catalyst, the mixture will not polymerize prior to use, i. e., the catalyzed polymerizable mixture will have a serviceable "pot life."

(3) The catalyzed polymerizable mixture will not be adversely affected with respect to curing time, i. e., the polymerization reaction once initiated will not be prolonged at the predetermined reaction temperature.

(4) The polymerized resin will undergo a minimum of discoloration, pitting, cracking and other undesirable defects during curing and aging.

(5) The rate of cure can be accelerated.

To date, the intensive research in this art has resulted in the testing of a host of compounds, none of which has been completely satisfactory. Among the numerous types of compounds which have been advanced as stabilizers for this class of polymerizable mixtures, have been polyhydric phenols, quaternary ammonium compounds and amine salts. However, although these compounds do retard gelation during storage, such have been found objectionable for one or more reasons. For example, such compounds which do improve "shelf life" continue to exert this stabilizing influence after the addition of polymerization catalyst(s). Thus, the presence of 0.01% by weight of 4-butyl-catechol has been found to prevent polymerization of a polyester-styrene copolymer mixture to which 1% of benzoyl peroxide has been added as catalyst for a period in excess of 3½ hours at 125° F. Accordingly, it can be said that the first stabilizers devised by the art acted also to prevent polymerization at curing temperatures within the practical range. This factor led to objectionably high curing temperatures, too rapid and/or incomplete cures. Therefore, such stabilizers as are presently known to the art are of limited utility.

It is, then, an object of this invention to provide improved stability in polymerizable unsaturated alkyd compositions and/or solutions thereof in ethylenically unsaturated polymerizable monomer(s).

A further object is to provide a group of compounds which act to prevent premature gelation of uncatalyzed polymerizable unsaturated polyester compositions and which act, also, to accelerate the rate of cure of such compositions after the addition of polymerization catalyst(s).

Other objects will be obvious from the following description of our invention.

We have made the surprising discovery that amidine-acid salts are effective as stabilizers when present in relatively minor amounts in polymerizable compositions containing polyesters of polyhydric alcohols and unsaturated polycarboxylic acids. The stabilizing effect of amidine salts extends particularly to such compositions forming 100% polymerizable solutions with copolymerizable ethylenically unsaturated monomer(s). Such novel compositions, after the addition of catalysts capable of promoting polymerization, not only retain their stability at ordinary temperatures, but also, in certain instances, exhibit accelerated cures upon being heated to useful curing temperatures.

An additional advantage of this class of novel stabilizers lies in the absence of excessive discoloration and other defects in the resulting cured resins.

Although all amidine salts are characterized by their ability to retard gelation of polymerizable unsaturated polyesters or mixtures thereof with copolymerizable ethylenically unsaturated compounds, the several specific members of this class will vary with respect to their efficacy to alter the pot life and rate of cure of the catalyzed composition. Also, the several acids available to form the amidine salt will vary somewhat in this respect. Thus, acetamidine hydrochloride is not only an efficient stabilizer but also a potent accelerator. On the other hand, acetamidine p-toluenesulfonate and acetate are good stabilizers but poor accelerators.

THE AMIDINE SALTS

The amidine salts of the halogen acids and especially the chlorides are in general excellent stabilizers, efficient pot life extenders and active curing rate promoters. These salts, therefore, represent the preferred members of this family of stabilizers. Many of the amidine salts which we have found to act as stabilizers are known in the art as chemical compounds. Our invention especially contemplates all such amidine salts which are represented by the following general formula:

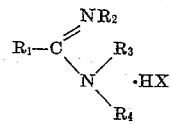

wherein X is the anion of an acid other than a peracid, and wherein $R_1$, $R_2$, $R_3$ and $R_4$ can be hydrogen or substituted hydrocarbon radicals and can be alike or different; $R_1$ can be the same or different than any of $R_2$, $R_3$ or $R_4$, except that in all cases when it is not hydrogen it is attached through a carbon atom thereof to the carbon atom shown. When not hydrogen the substituents can be alkyl, alkylene, aryl, aralkyl and/or cycloalkyl containing 20 and up carbon atoms. Further, any two of $R_1$, $R_2$, $R_3$ or $R_4$ can together represent a divalent radical forming a part of a 5 or 6 membered heterocyclic ring involving one or both of the nitrogen atoms of the amidine structure.

The $R_1$, $R_2$, $R_3$ and $R_4$ substituted hydrocarbon radicals can have functional groups such as hydroxy, alkoxy, acyloxy, carbonyl, carboxyl, bromo, chloro, etc. substituents.

Amidines, as a class, are derivatives of amides rather than of amines. For a discussion of the basic chemistry of amidines, see Sedgwick's Organic Chemistry of Nitrogen, Oxford University Press 1949 ed., page 155.

The wide structural variation possible in the group of amidine salts suitable for use in accordance with our invention is indicated by the following representative examples: formamidine nitrate; acetamidine phosphate; benzamidine hydrochloride; N-methylbenzamidine hydrochloride; N,N'-diphenylformamidine hydrochloride; N,N' - di - β-naphthylformamidine hydrochloride; N,N'-diphenylacetamidine hydrochloride; ethyleneacetamidine hydrochloride (i. e., 2-methylimidazoline hydrochloride); 2,3 - dihydro - 7-bromopyrido[1,2-α]pyridin-4-one hydrobromide (Journal American Chemical Society 77, 117 (1955)); N-pentamethylene acetamidine hydrochloride (i. e., N-acetiminopiperidine hydrochloride); ethylenephenylacetamidine hydrochloride (i. e., 2-benzylimidazoline hydrochloride); ethylenebenzamide hydrochloride (i. e., 2 - phenylimidazoline hydrochloride); 1,3-butyleneacetamidine hydrochloride (i. e., 2,4-dimethyltetrahydropyrimidine hydrochloride); 1,3-butylenebenzamidine hydrochloride (i. e., 2-phenyl-4-methyltetrahydropyrimidine hydrochloride; o-phenyleneacetamidine hydrochloride (i. e., 2-methylbenzimidazole hydrochloride); o-phenylenepelargonamidine hydrochloride (i. e., 2-octylbenzimidazole hydrochloride); o-phenylenebenzamidine hydrochloride (i. e., phenylbenzimidazole hydrochloride); (1,2-[1,4 - (1,3 - butadienyl)] [1,3[1 - N',3-N(1-ketopropylene)]] formamidine hydrochloride); (3,4-dihydropyrido-[1,2-α]-pyrimidine-2-one hydrochloride, see JACS, 77, 117 (1955))

The preparation of amidine salts is known to the art. For example, the amidines can be prepared by the action of alcoholic ammonia or of an alkyl or aryl amine on an iminoether hydrohalide according to the method of Pinner and Klein, Berichte, 10, 1990 (1877). This general method is illustrated by the following equation.

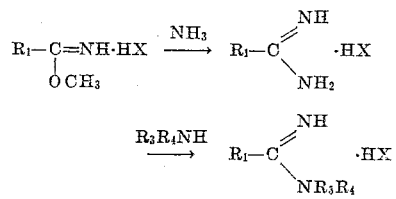

($R_1$, $R_3$, $R_4$ and X being defined as hereinabove stated)

N,N'-disubstituted formamidines are obtained according to the method of Claissen, Ann., 287, 360 (1895), by heating aromatic amines with ethyl orthoformate.

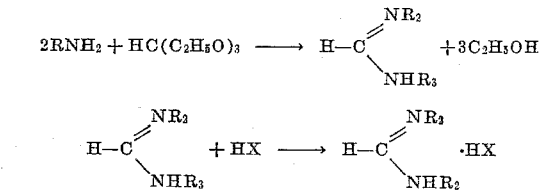

The treatment, according to the method disclosed by Hill and Cox JACS, 48, 3214 (1926) of N-substituted amides with phosphorus pentachloride gives rise to the imino chlorides which are then reacted with an appropriate amine to yield a polysubstituted amidine.

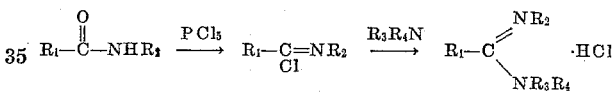

Reaction of iminoether hydrochlorides or amidine hydrochlorides with an alkylene diamine, e. g., ethylenediamine, as disclosed by Djerassi, JACS, 69, 1690 (1947) yields 2-substituted imidazolines acid salts.

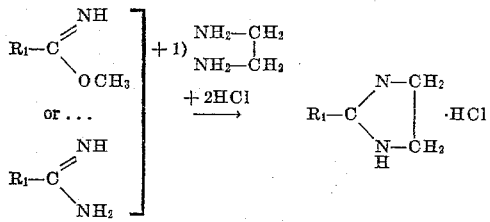

Benzimidazoles can be prepared by reaction of an o-phenylenediamine with a fatty acid as disclosed in Organic Synthesis Coll., vol. II, p. 65.

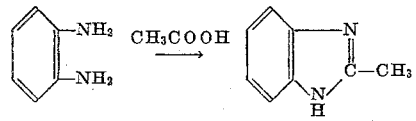

These methods are of general application and are mentioned to indicate the general state of the art of preparing amidines and their salts. It is not, however, intended to suggest that these methods referred to hereinabove are the only ones known to the art.

The amidine salts vary somewhat in their solubility in the polyester mass. Complete solubility is not necessary for effective use, however, since the benefits can be secured whenever the stabilizer has been incorporated in the polyester mass to provide relatively small quantities in a dissolved state. Generally, only limited amounts of the order of at least 0.01% by weight of the polymerizable mixture are required to impart the stabilizing and other desirable results. Preferably an amount within the range of 0.025% and 0.5% should be used and especially the advantages of our novel group of stabilizers will be evidenced by use of between 0.05% and 0.25% by weight. The salts can be introduced into either the hot or cold mixture in the form of aqueous or organic solvent solutions or directly as desired. The addition is preferably accomplished before any vinylic or other copolymerizable ethylenically unsaturated monomeric compound is admixed with the polyester. The preparation of the polyester as wel las of the polyester-ethylenically unsaturated monomer mixture is effected in a manner well known in the art. Our invention contemplates the addition of a stabilizing amount of at least one amidine salt to the polymerizable polyester mass as hereinabove defined.

THE POLYESTER

As is well known, the polyester is generally prepared in the presence of an organic solvent and the esterification is carried out to a predetermined degree, as measured by the acid number of the esterification mixture. After removal of the volatile solvent, it is common practice to incorporate the monomeric constituent(s). However, such a mixture will polymerize at this stage, even if the mass is cooled immediately after admixture of the monomer. By incorporation of at least one amidine salt in the hot polyester and then adding the monomeric material, this premature copolymerization is effectively prevented. The stabilized mixture can then be cooled to and maintained at the desired storage temperature for extended periods without danger of premature gelation. Thus, by use of amidine salts as stabilizers in the manufacture of polyester-monomer mixtures, a margin of safety is provided in the process—the advantages and benefits of which are obvious.

The polymerizable polyester compositions which are useful in practicing the principles of our invention are well known in the art. Such compositions, per se, constitute no part of our invention. The preparation and multitudinous variations in the preparation of the polymerizable compositions containing polyesters of polyhydric alcohols and ethylenically unsaturated polycarboxylic acids are described in various patents and publications relating to this general field of the polymer art. It should be appreciated that such compositions may, and usually do, contain other ingredients such as ethylenically unsaturated monomeric substances, pigments, fillers, modifying resins, solvents, plasticizers, inhibitors, other stabilizers, polymerization catalysts, mold lubricants, extenders and the like. The formulation, curing and further treatment of such compositions are likewise well known and understood by those skilled in this art and form no part of our invention.

A polymerizable unsaturated polyester is prepared by reaction of a polyhydric alcohol with ethylenically unsaturated polycarboxylic acid. It is preferable to employ a dihydric alcohol and a dicarboxylic acid in order to produce a product in which there is a maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule; for example, there may be an average of eleven or more double bonds in every ten molecules of the polyester.

The polymerizable unsaturated polyester can be produced by reaction of any desired combination of polycarboxylic acid and polyhydric alcohol. For example, an unsaturated dicarboxylic acid such as maleic, fumaric, itaconic, citraconic or mesaconic acid can be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Each of such unsaturated dicarboxylic acids contains a polymerizably reactive $\Delta^{2,3}$-enedioyl group, and a polymerizable unsaturated polyester or alkyd prepared from any one of such acids contains a plurality of such polymerizably reactive $\Delta^{2,3}$-enedioyl groups. In other words, each of the acids contains a polymerizably reactive $\Delta^{2,3}$-enoyl group (i. e., a group having the structure

and such groups are contained in dioyl radicals in the polyester molecule; hence the dioyl radicals may be defined as $\Delta^{2,3}$-enedioyl radicals (e. g., butenedioyl or ethylenedicarboxylyl radicals).

Instead of a single polycarboxylic acid or acid anhydride, a mixture of polycarboxylic acids and/or anhydrides can be employed, such as a mixture of an unsaturated dicarboxylic acid with a polycarboxylic acid containing more than two acid radicals, such as citric acid. A mixture of polyhydric alcohols can be employed, such as a mixture of dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids can be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also can be varied by selecting various reacting ingredients and varying their proportions. The infusibility, hardness and inertness of the product obtained by polymerization of the polyester can be increased by varying the initial reacting ingredients to increase the average number of double bonds per molecule of the polymerizable polyester.

The point to which the reaction of the ingredients is carried in the preparation of the polymerizable polyester is simply that point at which the product has the desired properties. The consistency or viscosity of the polyester varies directly with average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

The following copending applications and patents which are typical of the polyester art are here incorporated by reference: Application Serial No. 307,703, filed September 3, 1952; application Serial No. 377,265, filed August 28, 1953; and U. S. Patents 2,453,644; 2,593,787; 2,409,633; 2,443,735–2,443,741; 2,450,552; 2,255,313; 2,512,410; 2,280,256; 2,453,666; 2,610,168; 2,635,089.

It is common practice in this art to introduce a minor quantity of a phenolic or quinoid substance, e. g., 4-t-butyl catechol, hydroquinone, quinone or the like, as an auxiliary stabilizer to insure the stabilization of the mixtures to which our invention pertains and to retard the formation of self-polymerization products of the monomeric constituent, e. g., polystyrene, prior to use. This practice, while conventional, is not essential, and as said above, is an auxiliary measure. In instances described in the following examples, the stability of the compositions prepared would be adequate without the addition of the auxiliary agent.

The following examples will illustrate the preparation of the compositions of our invention:

Example 1

(A) *Preparation of polyester.*—A mixture of 22.6 mols of propylene glycol, 10 mols of maleic acid anhydride and 10 mols of phthalic acid anhydride was added to 8% by weight of xylene. The mixture was heated to and maintained between 320° and 360° F. under reflux conditions, until the acid number of the mass was 50 to 52. The solvent was removed in vacuo, and the residue cooled to about 75° F.

(B) *Preparation of polyester-styrene mixture.*—To 700 grams of the polyester preparation of part A above, heated to 235° to 240° F. were added 0.1 gram of 4-t-butyl catechol and 0.5 gram of acetamidine hydrochloride (0.05% by weight), the latter being added as a paste with several cc. of propylene glycol. The mixture was agitated thoroughly to disperse the stabilizer and then 300 gram of styrene were added slowly (about 5 minutes). The hot (about 180° F.) mass was filtered.

Alternatively, the acetamidine hydrochloride-propylene glycol paste can be added to the polyester, containing 4-t-butyl catechol, after it has been cooled to about 75° F., and then styrene incorporated into the mass.

In an analogous manner, other amidine salts have been incorporated in hot polyester-styrene mixtures, and the resultant stabilized masses were tested for gel-time, pot-life and storage life as described below. The results of these tests are set out in the following table:

TABLE I

| Stabilizer | Gel Time [1] (Sec.) | Pot Life (Hrs.) | 72° F. Mos. | 135° F. Days | 200° F. Hrs. |
|---|---|---|---|---|---|
| Polyester [2]—no stabilizer | Gelled on preparation. | | | | |
| Polyester [2]+0.01% 4-t-butyl catechol—no stabilizer | do | | | | |
| Acetamidine Hydrochloride | 270 | 1.25 | >18 | 23.0 | 6.0 |
| 1,3-butyleneacetamidine Hydrochloride | 765 | 4.0 | >8 | 20.0 | 8.5 |
| N,N′-Di-β-naphthylformamidine Hydrochloride | 730 | 10.0 | 2 | 2.0 | 3.0 |
| 1,2[1,4-(1,3-butadienyl)]-1,3-[1N;3N-(1-ketopropylene)] formamidine Hydrochloride. | 360 | 3.0 | >8 | >9.0 | >12.0 |
| N,N′-Diphenylbenzamidine Hydrochloride | 425 | 3.5 | >4 | 2.0 | 2.0 |
| N,N′-Diphenylacetamidine Hydrochloride | 335 | 4.0 | >5 | 5.0 | 11.5 |
| N,N′-Di-α-naphthylformamidine Hydrochloride | 900 | 16.0 | >8 | 3.0 | 1.25 |
| o-Phenylene-acetamidine Hydrochloride | 460 | 2.67 | >8 | 6.5 | 3.0 |
| Ethylenebenzamidine Hydrochloride | 350 | 2.0 | >7 | 6.0 | 2.5 |
| Ethylenephenylacetamidine Hydrochloride | 380 | 2.0 | >7 | 6.5 | 6.0 |
| o-Phenylenepelargonacetamidine Hydrochloride | 345 | 1.75 | >7 | 6.0 | 3.5 |
| o-Phenylene phenylacetamidine Hydrochloride | 660 | 2.5 | >2 | 12.0 | >8.0 |
| Benzamidine Hydrochloride | 390 | 3.0 | >2 | 9.2 | 4.7 |
| 2-Phenyl-4-methyl-tetrahydropyrimidine Hydrochloride | 310 | 2.5 | >2 | 13.5 | 4.0 |
| 2,4-Dimethyltetrahydropyrimidine Hydrochloride | 390 | 2.25 | >2 | >11.0 | 4.0 |
| N-Phenyl phenylacetamidine Hydrochloride | 540 | 3.0 | >2 | 2.5 | >8.0 |
| N-Methylbenzamidine Hydrochloride | 435 | 2.0 | >2 | >4.0 | 8.0 |
| N-Benzylbenzamidine Hydrochloride | 395 | 2.0 | >2 | >4.0 | >8.0 |
| N-Phenylbenzamidine Hydrochloride | 420 | 2.0 | >2 | 1.0 | >7.5 |
| 2-Phenylbenzimidazole Hydrochloride | 1,040 | 2.0 | >2 | >4.0 | 7.5 |
| Propamidine Hydrochloride | 360 | 3.5 | | | 2.75 |
| 2-Benzyl-4-methyl-tetrahydropyrimidine Hydrochloride | 345 | 2.5 | | | 2.5 |
| Acetamidine Acetate | >6,000 | >24.0 | | | 2.5 |
| Acetamidine Nitrate | 2,400 | | | 0.25 | 1.5 |
| o-Phenylene formamidine Hydrobromide | 600 | 14.0 | | 2.0 | 3.5 |
| Acetamidine Sulfate | 3,600 | | | | 2.0 |
| N-Phenylbenzamidine Sulfate | 3,000 | | | 0.9 | 1.5 |
| Ethylene acetamidine Hydrochloride | 405 | 4.5 | | | 2.75 |
| Acetamidine Phosphate | 5,400 | | | | 2.75 |
| Ethylene phenylacetamidine Acetate | 5,800 | | | 2.0 | 2.0 |
| Stearamidine Hydrochloride | 360 | 4.0 | | | 2.75 |
| Acetamidine-p-toluene Sulfonate | 10,800 | | | 0.75 | 1.75 |
| Acetamide | Gelled on preparation. | | | | |

[1] Gel time is determined by adding 0.05% (by weight) of t-butyl hydroperoxide to 100 grams of the unpolymerized polyestermonomer composition containing 0.01% 4-t-butylcatechol and 0.05% of the amidine. A 30 gram portion of this mixture is weighed into a 25 x 150 mm. test tube which then is immersed in a water bath maintained at 160° F. The time interval from immersion to the first appearance of gel particles in the catalyzed mass is taken as the "gel time."

[2] Indicates a polyester-styrene solution.

Example 2

To 700 grams of propylene maleate phthalate at 240° F. prepared as in Part A of Example 1 above, was added 0.5 gram of acetamidine hydrochloride dissolved in 2 grams of propylene glycol. Thereafter 300 grams of styrene were added slowly to the agitated mass. The mixture was filtered and allowed to cool to about 75° F. There was no evidence of gelation. A sample of the thus prepared mixture was heated to and maintained at 200° F. for ½ hour and again examined for evidence of gelation. None could be observed and, hence, this test is evidence of the stabilizing character of the amidine salt. A similar preparation omitting the amidine salt gelled in preparation.

In a similar fashion, a mixture of 700 grams of propylene maleate phthalate, prepared as in part A of Example 1, 0.5 gram of acetamidine hydrochloride, 0.1 gram of 4-t-butyl catechol (a polymerization inhibitor) and 300 grams of styrene were held at 200° F. In this instance also, no evidence of gelation could be detected after two hours.

*Example 3*

Propylene maleate phthalate was stabilized with 0.25% by weight of acetamidine hydrochloride and 0.01% by weight of 4-t-butyl catechol, and thereafter 50% by weight of diallyl phthalate was added. This mixture was stable for more than seven hours at 200° F., for more than ten days at 135° F., and for more than two months at about 75° F.

Replacement of the acetamidine hydrochloride by an equal weight of benzimidazole hydrochloride or of N,N'-diphenylacetamidine hydrochloride resulted in copolymerizable polyester mixtures of comparable stability.

Replacement of the diallyl phthalate with an equal amount of vinyl toluene gives a copolymerizable mixture of comparable stability.

Similar mixtures containing no stabilizer gelled within a short period following preparation.

These stabilized mixtures upon addition of a polymerization catalyst, e. g., methyl ethyl ketone peroxide ("DDM"), and heating in the usual manner, polymerized readily to hard clear products.

*Example 4*

The amidine salts are characterized as illustrated above by their ability to retard premature gelation of copolymerizable polyester-monomer mixtures. In order to be useful in commercial application, it is also desirable that such stabilizers should not continue to exhibit this inhibitory effect to any marked degree when the polymerizable mass is catalyzed with a suitable polymerization catalyst(s). In fact, it is eminently desirable that the polymerization be effected speedily and that the heat of polymerization be liberated smoothly. Too rapid evolution of heat gives rise to uneven cure which results in strains and other imperfections in the finished resin product.

The behavior of the imidine salts during polymerization has been found surprisingly to be accelerating rather than retarding. Further, we have found that the maximum temperature reached within the polymerizing mass is not unduly excessive.

These surprising additional features of our novel class of stabilizers have been demonstrated by the well-known "peak-exotherm" test in which a stabilized polyester-monomer mixture was prepared, and to 100 grams of said mixture 2 grams of a 50–50 mixture of benzoyl peroxide and tricresyl phosphate were added to catalyze the copolymerization. A 40 gram portion of the catalyzed mixture was weighed into a test tube (25 mm. x 150 mm.) and this was immersed in a water bath maintained at 180° F. By means of a conventional thermocouple and temperature recorder, the temperature of the mixture was determined. The time required for the temperature of the polymerizing mass to rise from 150° F. to the maximum (which is the so-called "peak exotherm") was observed. This test is generally accepted as one providing an indication of the rate at which a catalyzed mixture of this type will cure when heated.

The results of a number of such tests are given in Table II below:

TABLE II

| Stabilizer | Total Reaction Time from 150° F. to "PE" | Peak Exotherm ° F. ("PE") | Gel Time Sec.[1] |
|---|---|---|---|
| 0.01% 4TBC+0.05% N,N'-Dinaphthylformamidine Hydrochloride | Min. 5.2 | 441 | 730 |
| 0.01%+0.05% 1,2[1,4-(1,3-butadienyl)][1N',3N-(1-keto-propylene)]formamidine Hydrochloride | 6.0 | 429 | 360 |
| 0.01% 4TBC+0.05% Diphenylbenzamidine Hydrochloride | 5.2 | 432 | 425 |
| 0.01% 4TBC+0.05% N,N'-Diphenylacetamidine Hydrochloride | 5.5 | 440 | 335 |
| 0.01% 4TBC+0.05% N,N'-α-dinaphthylformamidine Hydrochloride | 9.5 | 417 | 900 |
| 0.01% 4TBC+0.05% o-phenyleneacetamidine Hydrochloride | 6.5 | 421 | 460 |
| 0.01% 4TBC+0.05% Ethylenebenzamidine Hydrochloride | 6.9 | 419 | 350 |
| 0.01% 4TBC+0.05% Ethylphenyleneacetamidine Hydrochloride | 6.2 | 421 | 380 |
| 0.01% 4TBC+0.05% o-phenylenepelargonacetamidine Hydrochloride | 6.8 | 423 | 345 |
| 0.01% 4TBC+0.05% Acetamidine Hydrochloride | 6.7 | 418 | 380 |
| 0.05% Acetamidine Hydrochloride | 4.9 | 438 | 230 |
| 0.01% 4TBC+0.05% Propamidine Hydrochloride | 6.8 | 400 | 360 |
| 2-Benzoyl-4-methyltetrahydropyrimidine Hydrochloride (.05%)+4TBC (.01%) | 5.2 | 421 | 345 |
| Acetamidine Acetate (.05%)+4TBC (.01%) | 19.9 | 422 | >6,000 |
| Acetamidine Nitrate (.05%)+4TBC (.01%) | 5.4 | 417 | 2,400 |
| Benzamidine Hydrobromide (.05%)+4TBC (.01%) | 8.3 | 416 | 600 |
| Acetamidine Sulfate (.05%)+4TBC (.01%) | 6.2 | 419 | 3,600 |
| N-Phenylbenzamidine Sulfate (0.5%)+4TBC (.01%) | 6.8 | 420 | 3,000 |
| Acetamidine-p-tosylate (.05%)+4TBC (.01%) | 4.7 | 412 | 10,800 |
| Acetamidine Phosphate (.05%)+4TBC (.01%) | 7.0 | 416 | 5,400 |
| 2-Methylimidazoline Hydrochloride (.05%)+4TBC (.01%) | 6.4 | 418 | 405 |
| Ethylenephenylacetamidine Acetate (.05%)+4TBC (.01%) | 6.5 | 419 | 5,800 |
| Stearamidine Hydrochloride (.05%)+4TBC (.01%) | 7.0 | 421 | 360 |
| 0.01% 4TBC[2] | 4.8 | 446 | 2,700 |

[1] Determined as described in footnote (¹) appended to Table I in Example 1 above.

[2] Special precautions were exercised in this preparation. The polyester-styrene mixture was made in 100 gram quantity and cooled as rapidly as possible after addition of 4TBC and styrene. "4TBC" represents 4-t-butyl catechol.

From the foregoing description and examples it will be evident that the amidine-acid salt structure is responsible for whatever quality it is that gives rise to stabilizing effects in connection with polymerizable polyester and/or polyester-monomer compositions. The amidine structure, as noted previously, can be embodied in a variety of compounds. Such compounds need not be composed only of carbon, hydrogen and nitrogen atoms, however, since other atoms can be employed either in substituents of an amidine grouping or as linking atoms between the amidine grouping and other radicals. Thus, in terms of $R_1$, $R_2$ and $R_3$ of the general formula, supra, these substituents can take the form of hydroxy, alkoxy, aryloxy, acyloxy, aldehydic, ketonic, carboxylic, ether, ester, and like oxygenated radicals. $R_4$ can be analogously nonhydrocarbon subject to the limitation expressed directly below the general formula, supra. Similar radicals wherein sulfur replaces oxygen can be used as well. Nitrogen-containing and/or halogen-containing substituents can also be used. Peroxide-containing radicals should, of course, be excluded. For the same reason, peracids should not be present in the salts of the amidine compounds. When the foregoing variations in the invention are carried in mind, one skilled in the art will recognize many compounds which can be prepared to give the stabilizing and other benefits which accrue to the particular compounds exemplified hereinabove. The invention contemplates the use of any of such equivalent compounds.

Having described our invention, what we claim is:

1. The method of retarding the premature gelation of a polymerizable composition which comprises a 100% polymerizable homogeneous liquid solution of: (a) polymerizable unsaturated, polyhydric alcohol-polycarboxylic acid polyester whose molecule contains a plurality of polymerizably reactive $\Delta^{2,3}$-enedioyl groups and (b) copolymerizable ethylenically-unsaturated liquid monomeric material, which comprises incorporating in said composition a small quantity of at least one amidine salt in an amount effective to delay said gelation when compared with a similar composition from which said small quantity of amidine salt has been omitted; said amidine salt being a coordination compound of an amidine with an acid which is inert in respect to catalyzing the polymerization of said polymerizable composition.

2. The method as claimed in claim 1 wherein said liquid ethylenically-unsaturated monomeric material is styrene.

3. The method as claimed in claim 2 wherein said amidine salt is an amidine hydrochloride and is present in amounts between about .01% and 0.5%.

4. The method as claimed in claim 1 wherein said amidine salt is at least one compound having the general formula

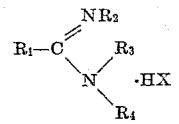

wherein $R_1$, $R_2$, $R_3$ and $R_4$ are selected from the group consisting of hydrogen, hydrocarbons having up to 20 carbons and divalent hydrocarbon radicals which replace any two of $R_1$, $R_2$, $R_3$ and $R_4$, and form a ring with at least one atom of the amidine structure

in which ring the number of atoms is selected from the group consisting of 5 and 6; and wherein X is is the anion of an acid which is inert in respect to catalyzing the polymerization of said polymerizable composition.

5. The method as claimed in claim 4 wherein the amidine salt is a hydrochloride.

6. The method as claimed in claim 5 where said amidine hydrochloride is acetamidine hydrochloride and is present in amounts between about .01%–0.5%.

7. A polymerizable composition which is stabilized against premature gelation, said composition comprising a homogeneous, 100% polymerizable, liquid solution of: (a) polymerizable, unsaturated, polyhydric alcohol-polycarboxylic acid polyester whose molecule contains a plurality of polymerizably reactive $\Delta^{2,3}$-enedioyl groups and (b) copolymerizable ethylenically-unsaturated liquid monomeric material, and a small incorporated amount of amidine salt, said small amount of the latter being effective to delay the gelation of said composition in the absence of polymerization catalyst when compared with a similar composition from which said small amount of amidine salt has been omitted; said amidine salt being a coordination compound of an amidine with an acid which is inert in respect to catalyzing the polymerization of said polymerizable composition.

8. A composition as claimed in claim 7 wherein said polyhydric alcohol is a dihydric alcohol and said polycarboxylic acid in an $\alpha,\beta$-ethylenic, $\alpha,\beta$-dicarboxylic acid.

9. A composition as claimed in claim 8 wherein said amidine salt consists of at least one compound having the general formula

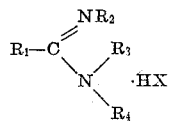

wherein $R_1$, $R_2$, $R_3$ and $R_4$ are selected from the group consisting of hydrogen, hydrocarbons having up to 20 carbons, and divalent hydrocarbon radicals which replace any two of $R_1$, $R_2$, $R_3$ and $R_4$, and form a ring with at least one atom of the amidine structure

in which ring the number of atoms is selected from the group consisting of 5 and 6; and wherein X is the anion of the acid which is inert in respect to catalyzing the polymerization of said polymerizable composition.

10. A composition as claimed in claim 8 wherein the amidine salt is present in amounts between about .01% and 0.5%.

11. A composition as claimed in claim 9 wherein said amidine salt is a hydrochloride.

12. A composition as claimed in claim 10 wherein the amidine salt is benzamidine hydrochloride.

13. A composition as claimed in claim 10 wherein the amidine salt is ortho phenyleneacetamidine hydrochloride.

14. A composition as claimed in claim 10 wherein the amidine salt is N,N'-diphenylformamidine hydrochloride.

15. A composition as claimed in claim 11 amidine hydrochloride is acetamidine salt and is present in amount between about .01% and 0.5%.

No references cited.